US012748793B2

(12) United States Patent
Meditz et al.

(10) Patent No.: US 12,748,793 B2
(45) Date of Patent: Sep. 29, 2026

(54) SYSTEMS AND METHODS FOR PROVIDING IMPROVED RETRIEVAL AUGMENTED GENERATION (RAG) FOR QUERY RESPONSE

(71) Applicant: THE BANK OF NEW YORK MELLON, New York, NY (US)

(72) Inventors: Diana Meditz, New York, NY (US); Yikai Feng, New York, NY (US)

(73) Assignee: The Bank of New York Mellon, New York, NY (US)

( * ) Notice: Subject to any disclaimer, the term of this patent is extended or adjusted under 35 U.S.C. 154(b) by 0 days.

(21) Appl. No.: 19/003,593

(22) Filed: Dec. 27, 2024

(65) Prior Publication Data

US 2026/0187122 A1 Jul. 2, 2026

(51) Int. Cl.
*G06F 16/00* (2019.01)
*G06F 16/3329* (2025.01)
*G06F 16/334* (2025.01)

(52) U.S. Cl.
CPC .... *G06F 16/3347* (2019.01); *G06F 16/33295* (2025.01)

(58) Field of Classification Search
CPC ........................ G06F 16/3347; G06F 16/33295
(Continued)

(56) References Cited

U.S. PATENT DOCUMENTS 9,002,773 B2 4/2015 Bagchi et al.
9,348,900 B2 5/2016 Alkov et al.
(Continued)

FOREIGN PATENT DOCUMENTS

CN 117112755 A 11/2023
CN 117216222 A 12/2023
(Continued)

OTHER PUBLICATIONS

International Search Report & Written Opinion of the International Searching Authority dated Mar. 10, 2026, issued in corresponding International Application No. PCT/US2025/054339 (11 pgs.).
(Continued)

*Primary Examiner* — Raquel Perez-Arroyo
(74) *Attorney, Agent, or Firm* — Pillsbury Winthrop Shaw Pittman, LLP

(57) ABSTRACT

Systems and methods for providing improved retrieval augmented generation for query response, retrieve key-value pairs from a key-value pairs database; index the key-value pairs into vector stores, wherein a first vector store contains the keys from the key-value pairs, a second vector store contains the values from the key-value pairs, and a third vector store contains value chunks of the values; process a query through the first and third vector stores to generate a list of keys and a list of value chunks from their respective stores; retrieve, from the second vector store, corresponding values to the keys in the list of keys from the first vector store; compose, an augmented prompt based on an aggregation of the query, the list of keys, the corresponding values, and at least a portion of the value chunks; and generate a proposed response by feeding the augmented prompt into a large language model.

17 Claims, 5 Drawing Sheets

(58) Field of Classification Search
USPC .......................................................... 707/748
See application file for complete search history.

(56) References Cited

U.S. PATENT DOCUMENTS

| | | | |
|---|---|---|---|
| 9,697,477 | B2 | 7/2017 | Oh et al. |
| 9,720,981 | B1 | 8/2017 | Boguraev et al. |
| 10,255,273 | B2 | 4/2019 | Chakraborty et al. |
| 10,706,090 | B2 | 7/2020 | Sun et al. |
| 11,016,966 | B2 | 5/2021 | Kim et al. |
| 11,106,664 | B2 | 8/2021 | Mcelvain et al. |
| 11,157,564 | B2 | 10/2021 | Prakash et al. |
| 11,748,577 | B1 | 9/2023 | Aberle |
| 11,769,017 | B1 | 9/2023 | Gray et al. |
| 11,861,320 | B1 | 1/2024 | Gajek et al. |
| 11,966,704 | B1 | 4/2024 | Magary et al. |
| 11,971,914 | B1 | 4/2024 | Watson et al. |
| 11,990,123 | B1 | 5/2024 | Rosser |
| 2020/0034722 | A1 | 1/2020 | Oh et al. |
| 2022/0237213 | A1 | 7/2022 | Karlberg et al. |
| 2024/0012842 | A1 | 1/2024 | Kislal et al. |
| 2024/0020538 | A1 | 1/2024 | Socher et al. |
| 2024/0038226 | A1 | 2/2024 | Nouri et al. |
| 2024/0095460 | A1 | 3/2024 | Xu et al. |
| 2024/0119075 | A1 | 4/2024 | Mallick et al. |
| 2024/0126794 | A1 | 4/2024 | Cook |
| 2024/0160902 | A1 | 5/2024 | Padgett et al. |
| 2024/0346256 | A1 | 10/2024 | Qin |
| 2024/0346566 | A1 | 10/2024 | Qin |
| 2025/0086215 | A1* | 3/2025 | Kumar .................. G06F 16/345 |
| 2025/0238470 | A1* | 7/2025 | Penta .................. G06F 16/9535 |
| 2025/0272506 | A1* | 8/2025 | Sassak, Jr. .............. G06F 40/40 |

FOREIGN PATENT DOCUMENTS

| | | |
|---|---|---|
| CN | 117371457 A | 1/2024 |
| CN | 117648417 A | 3/2024 |
| CN | 117787417 A | 3/2024 |

OTHER PUBLICATIONS

Zhi Jing et al., "When Large Language Models Meet Vector Databases: A Survey", arXiv:2402.01763v2, Feb. 2024 URL: https://arxiv.org/html/2402.01763v2 9 pgs.

* cited by examiner

200

400

SYSTEMS AND METHODS FOR PROVIDING IMPROVED RETRIEVAL AUGMENTED GENERATION (RAG) FOR QUERY RESPONSE

CROSS-REFERENCE TO RELATED APPLICATIONS

No cross-reference is presented at this time.

BACKGROUND

Key-value pair structures are widely used across various domains to capture, store, and retrieve information efficiently. These structures are particularly useful in scenarios where keys such as questions, inquiries, queries, and/or other inputs, must be paired with specific, tailored values or sets of values, e.g., answers, responses, replies, and/or other outputs or data. Examples of such applications include but are not limited to question-and-answer pairs, such as, for example, responses to Due Diligence Questionnaires (DDQs), responses to Requests for Proposals (RFPs), or other inquiries.

Key-value pairs may be utilized to prioritize recommendations by structuring and organizing data (e.g., in data taxonomies, etc.) in a way that facilitates retrieval, evaluation, and ranking of potential options. In this context, the "key" represents a query, parameter, or classification criteria, while the "value" represents the corresponding data, attributes, or outcomes associated with the key. This structure allows systems to dynamically assess the relationship between the key and its possible values to prioritize recommendations, such as suggesting a classification for a dataset.

By way of example, RFPs and DDQs are often used as tools in the procurement of services and risk assessment. RFPs require detailed responses from service providers on topics such as compliance, risk management, and service capabilities, which inform prospective clients' decisions by evaluating qualifications and reliability. Similarly, DDQs enable clients to assess a provider's internal operations, control structures, and compliance measures, determining the risk level associated with engaging the service provider. Institutions may receive thousands of RFPs and DDQs each year, each containing extensive questions that require customized, accurate answers. Currently, this process is labor-intensive, with RFP/DDQ writers taking three to five days to draft initial responses. Even with prior responses available, this manual approach can lead to inconsistencies and errors, especially at scale.

Current systems that implement key-value pairs face several limitations that may impact their efficiency, accuracy, and scalability. One limitation is the labor-intensive nature of the process, which often requires substantial manual effort to identify and provide the best matching value or values for a given key. While automated systems may partially mitigate this challenge, the reliance on manual oversight and intervention persists, particularly in cases where nuanced or context-specific decisions are required.

Another limitation involves the computational resources required to manage and process key-value pairs effectively. As datasets grow in size and complexity, current approaches often struggle to perform similarity computations, ranking, or prioritization at scale without significant computational overhead. This issue becomes more pronounced in systems that rely on exhaustive searches across large data stores, leading to slower response times and reduced efficiency.

Even when historical key-value pairs are available in structured data stores, current systems frequently encounter challenges related to inconsistency and error propagation. For example, differences in how keys or values are labeled, structured, or indexed may result in mismatches or redundant entries, complicating the retrieval and ranking processes. Additionally, systems relying on static or inflexible rules for matching keys to values may fail to adapt to changing contexts or evolving data patterns, leading to suboptimal or incorrect outputs.

At scale, these limitations are further exacerbated. The volume and diversity of key-value pairs in large data repositories increase the likelihood of inconsistencies, such as overlapping keys associated with conflicting values or missing metadata necessary for accurate matching. Furthermore, maintaining the accuracy and relevance of key-value pairs over time requires continuous updates, validations, and curation, which are often resource-intensive and prone to human error.

Another challenge lies in the limited ability of current systems to leverage semantic relationships between keys and values. Many systems rely on exact matches or predefined rules, which may overlook more nuanced associations or contextual information. For instance, keys expressed differently but with similar meanings (e.g., "client feedback" vs. "customer reviews") may not be accurately matched to their corresponding values, reducing the effectiveness of the system.

Recent advancements in Large Language Models (LLMs) and Retrieval-Augmented Generation (RAG) techniques offer a partial solution to these inefficiencies. RAG integrates LLMs with external knowledge bases (e.g., data stores or databases), often stored in vector stores, where past responses or relevant data points are transformed into vectorized content. Upon receiving a new query, the system calculates similarity scores between the query and stored content, retrieving top matches to provide contextual support for the LLM in generating an informed response. This process seeks to emulate a manual task of locating relevant past key-value pairings, e.g., past answers to similar questions, thereby enhancing response speed and consistency.

However, RAG faces multiple technical limitations that hinder its ability to fully address the complexities of such automation. One challenge is entity-specific adaptability. Simple RAG implementations lack the customization necessary to produce responses tailored to specific organizational contexts. The similarity-based retrieval method does not account for nuanced requirements or the unique tone and style preferences of each client, limiting RAG's ability to deliver responses compliant with entity-specific guidelines or industry standards. Furthermore, RAG lacks robust contextual awareness, as its similarity scoring may overlook subtle differences in question context and intent. Questions with similar wording but distinct implied meanings can yield inaccurate responses, as the model cannot consistently recognize these differences.

Scalability also presents a challenge as stored responses grow in volume, requiring substantial computational power for vector similarity calculations and increasing hardware costs, especially when the retrieval set includes hundreds of thousands of documents. Maintaining high retrieval accuracy under these conditions is difficult and may require specialized hardware or optimization strategies. Additionally, RAG-based models sometimes provide inconsistent response quality. Retrieved information may be relevant but outdated or misaligned with current standards, and, if it lacks coherence with the new query, the generated response can be factually correct but imprecise. Achieving consistency in responses remains difficult, particularly as content must keep pace with evolving regulatory or client expectations.

The quality of RAG responses also heavily relies on data integrity. If the vector store contains inaccuracies in indexing, labeling, or vectorization, these errors impact the retrieval process, resulting in irrelevant or misleading information. This risk compromises the reliability of RAG-assisted responses, potentially delivering answers that fail to accurately reflect the service provider's current capabilities or standards. While RAG-enhanced LLMs provide a basis for automating first attempts at identifying relevant values, e.g., for drafts of responses, limitations in entity-specific adaptability, contextual accuracy, scalability, consistency, and data integrity restrict the effectiveness of current solutions.

SUMMARY

Aspects of the disclosure relate to methods, systems, and/or apparatuses for providing improved RAG for query response.

In some aspects, the techniques described herein relate to a method for providing improved retrieval augmented generation (RAG) for query response, including: retrieving, by a processor, a plurality of key-value pairs from a key-value pairs database; indexing, by the processor, the plurality of key-value pairs into a plurality of vector stores, wherein a first vector store contains the keys from the plurality of key-value pairs, a second vector store contains the values from the plurality of key-value pairs, and a third vector store contains a plurality of value chunks of the values; processing, by the processor, a query through the first vector store and the third vector store to generate a list of keys from the first vector store and a list of value chunks from the third vector store; retrieving, from the second vector store, corresponding values to the keys in the list of keys from the first vector store; composing, by the processor, an augmented prompt based on an aggregation of the query, the list of keys, the corresponding values, and at least a portion of the value chunks from the list of value chunks; and generating, by the processor, a proposed response by feeding the augmented prompt into a large language model (LLM).

In some aspects, the techniques described herein relate to a method, further including: retrieving, by the processor, from the second vector store, a revised list of values based on the proposed response; comparing, by the processor, a highest ranked value from the revised list of values with the proposed response; and based on a similarity threshold, outputting, by the processor, one of the highest ranked value from the revised list of values or the proposed response as a final response.

In some aspects, the techniques described herein relate to a method, further including altering the revised list of values based on one or more additional criteria for reranking values in the revised list of values.

In some aspects, the techniques described herein relate to a method, wherein the key-value pairs store is an external data store.

In some aspects, the techniques described herein relate to a method, wherein the processor is configured to retrieve as least one of keys, values, or value chunks based on respective cosine similarity scores.

In some aspects, the techniques described herein relate to a method, wherein the chunked values are generated by breaking down the values from the plurality of key-value pairs into shorter chunks of data.

In some aspects, the techniques described herein relate to a method, wherein the plurality of key-value pairs includes a plurality of question-and-answer pairs; and wherein the key-value pairs store is a question-and-answer pairs store.

In some aspects, the techniques described herein relate to a method for providing improved retrieval augmented generation (RAG) for query response, including: retrieving, by a processor, a plurality of question-and-answer pairs from a question-and-answer pairs database; indexing, by the processor, the plurality of question-and-answer pairs into a plurality of vector databases, wherein a first vector database contains the questions from the plurality of question-and-answer pairs, a second vector database contains the answers from the plurality of question-and-answer pairs, and a third vector database contains a plurality of answer chunks of the answers; processing, by the processor, a query through the first vector database and the third vector database to generate a list of questions from the first vector database and a list of answer chunks from the third vector database; retrieving, from the second vector database, corresponding answers to the questions in the list of questions from the first vector database; composing, by the processor, an augmented prompt based on an aggregation of the query, the list of questions, the corresponding answers, and at least a portion of the answer chunks from the list of answer chunks; and generating, by the processor, a proposed response by feeding the augmented prompt into a large language model (LLM).

In some aspects, the techniques described herein relate to a method, further including: retrieving, by the processor, from the second database, a revised list of answers based on the proposed response; comparing, by the processor, a highest ranked answer from the revised list of answers with the proposed response; and based on a similarity threshold, outputting, by the processor, one of the highest ranked answer from the revised list of answers or the proposed response as a final response.

In some aspects, the techniques described herein relate to a method, further including altering the revised list of answers based on one or more additional criteria for reranking answers in the revised list of answers.

In some aspects, the techniques described herein relate to a method, wherein the question-and-answer pairs database is an external database.

In some aspects, the techniques described herein relate to a method, wherein the processor is configured to retrieve as least one of questions, answers, or answer chunks based on respective cosine similarity scores.

In some aspects, the techniques described herein relate to a method, wherein the chunked answers are generated by breaking down the answers from the plurality of question-and-answer pairs into shorter chunks of text.

In some aspects, the techniques described herein relate to a system for providing improved retrieval augmented generation (RAG) for query response, including: memory storing computer program instructions; and one or more processors configured to execute the computer program instructions to: retrieve a plurality of key-value pairs from a key-value pairs database; index the plurality of key-value pairs into a plurality of vector stores, wherein a first vector store contains the keys from the plurality of key-value pairs, a second vector store contains the values from the plurality of key-value pairs, and a third vector store contains a plurality of value chunks of the values; process a query through the first vector store and the third vector store to generate a list of keys from the first vector store and a list of value chunks from the third vector store; retrieve, from the second vector store, corresponding values to the keys in the list of keys from the first vector store; compose, an augmented prompt based on an aggregation of the query, the list of keys, the corresponding values, and at least a portion of the value chunks from the list of value chunks; and generate a proposed response by feeding the augmented prompt into a large language model (LLM).

In some aspects, the techniques described herein relate to a system, further configured to: retrieve, from the second vector store, a revised list of values based on the proposed response; compare a highest ranked value from the revised list of values with the proposed response; and based on a similarity threshold, output one of the highest ranked value from the revised list of values or the proposed response as a final response.

In some aspects, the techniques described herein relate to a system, further configured to alter the revised list of values based on one or more additional criteria for reranking values in the revised list of values.

In some aspects, the techniques described herein relate to a system, wherein the key-value pairs store is an external data store.

In some aspects, the techniques described herein relate to a system, wherein the processor is configured to retrieve as least one of keys, values, or value chunks based on respective cosine similarity scores.

In some aspects, the techniques described herein relate to a system, wherein the chunked values are generated by breaking down the values from the plurality of key-value pairs into shorter chunks of data.

In some aspects, the techniques described herein relate to a system, wherein the plurality of key-value pairs includes a plurality of question-and-answer pairs; and wherein the key-value pairs store is a question-and-answer pairs store.

Various other aspects, features, and advantages will be apparent through the detailed description and the drawings attached hereto. It is also to be understood that both the foregoing general description and the following detailed description are illustrative and not restrictive of the scope of the disclosure.

Figure 1:
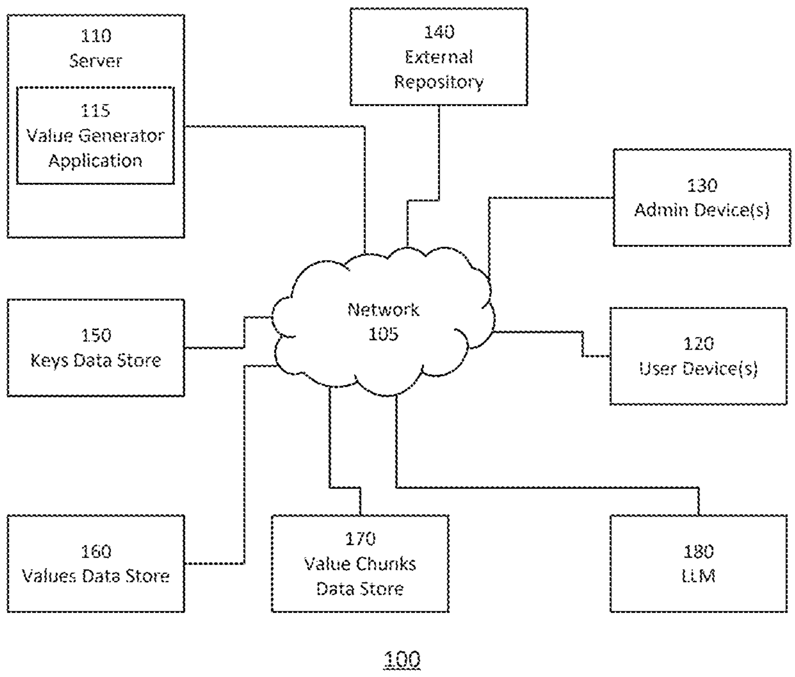
FIG. 1 depicts an illustrative system for providing improved retrieval augmented generation for query response, in accordance with at least one embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

To mitigate the problems described herein, the inventors had to both invent solutions and, in some cases just as importantly, recognize problems overlooked (or not yet foreseen) by others in the field. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Embodiments of the systems and methods described herein leverage Large Language Models (LLMs), employing the Retrieval Augmented Generation (RAG) technique to address technical challenges associated with identifying more accurate key-value pairs, e.g., question and answer (Q&A) pairs, through text similarity comparison. This approach aims, for example, to replicate or enhance the process wherein values (e.g., answers or other replies) are manually retrieved from similar previously matched key-value pairs, e.g., previously answered questions, responding in dialogs, previous classifications, etc. RAG serves as a technique to enhance the accuracy and reliability of generative AI (GenAI) models by expanding the model's knowledge base with context drawn from external sources.

In some embodiments, a processor first computes a similarity score between the incoming content, such as a query, and external data sources, which may include key-value pairs, e.g., Q&A pairs, stored in a vector store, and/or chunks thereof, as described herein. The processor may then retrieve only the top similar data, subsequently providing this data along with the incoming query to the generative AI model to generate a response. In various embodiments, the systems and methods described herein enable customization of vector stores with data tailored to specific use cases as further described herein.

Certain embodiments employ a process utilizing multiple RAG techniques that connect to distinct vector stores, each designated for specific purposes. For example, rather than relying on a single vector store, multiple vector stores may be employed to serve different functions, such as key (e.g., question) search, value (e.g., answer) search, and/or value chunk search (e.g., answer chunk search), as described herein. Additionally, some embodiments may extend the process by integrating an LLM-based re-ranker, which enhances the relevance and quality of the results returned.

The RAG technique represents a recent advancement in GenAI technology that enables more accurate and reliable performance of LLMs. RAG operates as a standalone technique for general key-value tasks, such as Q&A tasks, where the retrieval results typically serve as supporting evidence for content generation. However, simple implementations of RAG may have performance limitations, including lower response quality and limited customization options. In these simple RAG systems, the ranking process remains fixed, performing only a single ranking based on the initial similarity search, which may not always yield optimal results.

In embodiments of the systems and methods described herein, an enhanced RAG system may incorporate a re-ranking mechanism that revisits and adjusts the ranking of retrieved information, improving the alignment of the retrieved results with the incoming query. Such embodiments implement a re-ranker that processes and reorganizes the initially ranked information based on additional criteria, thus refining the quality of the supporting evidence provided to the generative AI model. The enhanced RAG structure in these embodiments employs a multi-stage pipeline that aggregates several RAGs, each designed for specific functions, and introduces interactive processes among them. This pipeline may serve various purposes, such as retrieving potential answers, refining answer quality so that the final selection of evidence is optimally ranked according to relevance to the query.

In certain embodiments, a re-ranking mechanism may output the most relevant supporting evidence from among multiple sources, leveraging both historical data and new LLM-generated content. This approach provides a flexible framework capable of adjusting dynamically between the use of previously provided human data and fresh AI-generated responses. The pipeline and re-ranking combination may further enhance the quality of model-generated answers, offering a more adaptable system suited for integration with downstream applications. Embodiments thus extend beyond simple RAG by allowing threshold-based decision-making, whereby the system may identify specific conditions under which it is beneficial to transition from historical data to AI-generated data. In such embodiments, the system may adjust the retrieval and ranking processes in real-time based on the quality threshold, thereby helping responses meet high standards of relevance and reliability. This enhanced approach to RAG facilitates higher-quality outputs and greater customization capabilities, addressing performance limitations found in simple RAG implementations.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

FIG. 1 depicts an illustrative system 100 for providing improved RAG for query response, in accordance with at least one embodiment. In some embodiments, various devices and applications described herein may be configured to communicate via network 105. In some embodiments, computing devices and servers described herein may communicate over network 105, which, in various embodiments, may be any of a diverse range of networks, each tailored to specific needs: Local Area Networks (LANs) linking devices within a confined area such as a home or office; Wide Area Networks (WANs) connecting devices across larger geographical areas, such as cities or countries; Metropolitan Area Networks (MANs) serving as intermediaries, connecting LANs within a city or region; wireless networks; cellular networks; Storage Area Networks (SANs); and/or Virtual Private Networks (VPNs) secure data over public networks. In some embodiments, network 105 may be any combination of the above, which may be a combination of private and public networks.

In some embodiments, each of the elements of system 100 may be or may include applications executed on respective computing systems, though this need not always be the case. In some examples, one or more of the applications may be executed on a single computing system (which is not to suggest that such a computing system may not include multiple computing devices or nodes, or that each computing device or node need be co-located; indeed, a computing system including multiple servers that house multiple computing devices may be operated by a single entity and the multiple servers may be distributed, e.g., geographically).

For example, in some embodiments, an entity may execute, on a server or other computing system, e.g., server 110, an AI-Assisted value generator application, value generator application 115, e.g., for prioritizing recommendations, recommending certain classifications for datasets, answering RFPs, DDQs, and/or other requests for information. Moreover, in some examples, the entity may also provide users access to value generator application 115 on various user devices (e.g., devices 120 and/or 130, described herein), which may be a web-based application hosted by a computing system managed by or provisioned by the entity, or which communicates with such a computing system via an application programming interface (API). Accordingly, one or more of the devices/systems/elements depicted herein may communicate with one another via messages transmitted over network 105, such as the Internet and/or various other local area networks. For example, one or more applications may communicate via messages transmitted over network 105.

In some example embodiments, server 110 may include, host, or otherwise execute value generator application 115. In some embodiments, value generator application 115 may be a user-facing application with which a user interfaces to access various aspects of the systems and methods described herein. For example, one or more users may use one or more user devices 120, e.g., to input data (e.g., text or other inputs). For example, in the context of a RFP system, users may have various interactions with server 110, e.g., to generate answers to RFPs, DDQs, and other requests for information. Accordingly, in various embodiments, users may access user devices 120 to input or otherwise provide data and other information into server 110.

Similarly, in some embodiments, administrators and/or other managers within an entity or organization may use admin devices 130 to input data and other information, e.g., with respect to the RFP system, its various users and settings, etc. For example, admin users, e.g., from internal audit, compliance, or IT departments, may be responsible for managing and/or configuring the RFP system. One or more of these users may be more focused on the quality of answers provided by the system, and/or the overall efficiency of the system. For example, such admin users may set up the system's parameters and rules, defining, e.g., how to rank various data, what kinds of data are sufficiently responsive to requests for information, etc. In some embodiments, admin users may establish thresholds (e.g., of establishing similarity scores, etc.), determine which data is used in the generation of responses, and which information to provide as outputs. In some embodiments, admin users may maintain and adjust the system, e.g., as the organization evolves or in response to various types of requests for information. They may respond to feedback from end users by fine-tuning the parameters to refine responses, reduce inaccuracies, or address other errors. Admins may also integrate new data sources, new LLM models, etc., via admin devices 130.

In some example embodiments, value generator application 115 may be configured to coordinate with one or more repositories (e.g., databases or data stores), e.g., external repository 140 and/or other vector data stores such as, e.g., keys data store 150, values data store 160, and/or value chunks data store 170, as described in detail herein. External repository 140 may be one or a collection of databases, containing key-value pairs, e.g., Q&A pairs. In some embodiments, incorporating a key-value pairs database in a RAG system may serve as a useful component for storing, organizing, and retrieving contextual data to enhance the accuracy and reliability of responses generated by an LLM, such as LLM 180, described herein. The key-value pair database may take various forms, be populated with diverse types of data, and be implemented using multiple architectures and techniques.

In some embodiments, external repository 140 may consist of structured datasets containing pairs of keys and values, e.g., questions and their corresponding answers. These pairs may be derived from historical user interactions, curated content repositories, knowledge bases, and/or externally sourced datasets. The data may include plain text, multimedia metadata, or semantic embeddings of key-value pairs, e.g., Q&A pairs. This data may cover a broad range of domains or be specialized for particular applications, such as, e.g., financial information, technical support, customer service, medical advice, legal consultations, etc. In various embodiments, the repository may be implemented using vector storage technology, where each key-value pair, e.g., each Q&A pair, is converted into a high-dimensional vector representation. These vectorized representations may allow for efficient similarity computations during the retrieval process. The repository may be designed to integrate with machine learning pipelines to enable seamless updates and adaptations based on new data inputs or evolving use cases. For example, in dynamic environments, the database may continually update itself by ingesting new key-value pairs, e.g., Q&A pairs derived from user feedback or new content sources.

In some embodiments, external repository 140 may support multiple layers of customization. In some instances, the database may include metadata tags or annotations associated with each key-value pair, such as context labels, domain specificity, confidence scores, and/or timestamps. These metadata tags may enable the system to filter or prioritize retrieved data based on the current query's requirements. For example, a certain RAG system may prioritize answers tagged with high reliability and recent publication dates.

In some embodiments, external repository 140 may also be integrated with other external knowledge bases or API-driven data sources. Such integration may extend the system's capability to retrieve supporting evidence beyond pre-stored key-value pairs. For example, the database may function as a hybrid storage system, retrieving static key-value pairs from internal storage while dynamically querying external APIs for the latest data updates.

Embodiments may further involve specialized indexing mechanisms to improve the efficiency of retrieval operations. Indexing strategies, such as inverted indices, hierarchical clustering, or approximate nearest neighbor search algorithms, may be employed to optimize the scalability and speed of the database, particularly in high-traffic environments. Additionally, re-ranking mechanisms may be applied post-retrieval to refine the ranking of results based on query relevance, user preferences, or other criteria, as described herein.

In some embodiments, external repository 140 may be partitioned into multiple sub-date stores or logical clusters, each optimized for specific tasks. For instance, system 100 may include separate sub-databases for key identification, value retrieval, value chunks, contextual evidence retrieval, etc. These clusters may operate independently or interactively within the RAG system pipeline so that the most relevant information is retrieved for a given query. In some embodiments, system 100 may include multiple additional data stores which are configured to operate in conjunction with external repository 140, and in which data from external repository 140 may be further indexed, e.g., keys data store 150, values data store 160, and/or value chunks data store 170. In some embodiments, some or all keys from the key-value pairs stored in external repository 140 may be further indexed or stored into keys data store 150. In some embodiments, questions may be indexed using vectorization or similar techniques, enabling efficient similarity searches. In some embodiments, some or all values from the key-value pairs stored in external repository 140 may be further indexed or stored into values data store 160. In some embodiments, values may be indexed using vectorization or similar techniques, enabling efficient similarity searches. In some embodiments, chunked values obtained by breaking down longer values, e.g., longer answers, (from the key-value pairs) into shorter chunks may be further indexed or stored in value chunks data store 170.

In various embodiments, longer values derived from key-value pairs may be divided into smaller segments or "chunks," which may then be indexed or stored in value chunks data store 170. This process of chunking full values (e.g., full answers) into shorter, manageable pieces may enhance the system's ability to retrieve and utilize relevant data more effectively and accurately. In some embodiments, chunking may be implemented using predefined logic, where each chunk is constrained to a maximum size, such as 500 characters. In some embodiments, an overlap between adjacent chunks may also be introduced, where a current chunk overlaps with the preceding or succeeding chunk by a fixed number of characters, such as 100 characters.

In some embodiments, the system may employ tools or frameworks, such as, e.g., the Langchain package, to perform the chunking process. However, the chunking parameters, such as chunk size and overlap, may not be fixed and, in various embodiments, may be customizable to meet specific use case requirements. Customizations may involve adjustments to the size of each chunk, the degree of overlap, and/or the method used to segment the content, depending on the type and structure of the data. In certain embodiments, chunking values into smaller pieces may improve the relevance of the retrieved data when used in conjunction with a LLM, such as LLM 180. By segmenting full values, e.g., full answers into smaller chunks, the system may allow the LLM to identify the specific segment most relevant to a given query, rather than processing an entire value, which may contain extraneous or irrelevant information. This approach may reduce noise in the generation process by isolating the most pertinent content and preventing less relevant portions of the value from being considered.

Additionally, in some embodiments, the segmented chunks stored in value chunks data store 170 may be indexed using vectorization or similar techniques, enabling efficient similarity searches. When a query is submitted to the system, the similarity computation process may operate at the chunk level, retrieving only those portions of values that align closely with the query. This method may enhance the precision of the retrieval process by narrowing down the context provided to the LLM, thus improving the quality and relevance of the generated response, as described herein.

Embodiments may also accommodate further enhancements, such as dynamically adjusting the chunking parameters based on the nature of the input data or the requirements of the downstream application. For example, answers or other values with dense technical content may require smaller chunks and greater overlap to capture fine-grained details, while narrative-style content may benefit from larger chunks with minimal overlap. These variations in chunking implementation may allow the system to be tailored to specific domains or use cases, thereby optimizing its performance in diverse applications.

In some embodiments, value generator application 115 may query the various vector data stores, and may perform similarity searches to find vectors that closely match the content or meaning of the query being evaluated. Combining data from the data store with the user query, value generator application 115 may be configured to compose or otherwise prepare an augmented prompt for LLM 180, to generate a response to the query (as described in more detail herein). In some embodiments, the LLM response may be used to retrieve the top full answers from vector data store 160, e.g., using cosine similarity scores as the ranking metric in the retrieval. In some embodiments, as described in detail herein, value generator application 115 may be further configured to execute a post-processing step that provides the user the flexibility to alter the contents of vector data store 160 and/or incorporate additional criteria for the re-ranking. In some embodiments, the retrieved full value (e.g., full answer) with the highest similarity score may be compared to a user-defined threshold, e.g., 80%. In some embodiments, if the top similarity score exceeds the threshold, the top full value (e.g., full answer) may be used as the final response sent to the user, and if the top similarity score is lower than the threshold, the LLM generated response may be used as the final response instead.

It should be noted that, in various embodiments, LLM 180 may include or employ other and/or additional types of models that are able to process large data sets. As understood herein, LLMs are machine learning models that are characterized by a massive number of parameters and typically leverage substantial computational resources for training and inference. These models are often designed to handle complex and high-dimensional data, enabling them to capture intricate patterns and relationships within the data. LLMs are often based on deep learning architectures like deep neural networks, convolutional neural networks (CNNs), or transformer models. Other models may include, for example, Rule-Based Natural Language Processing (NLP) Systems, Template-Bases Systems, Bag-of-Words algorithms, N-Gram models, Latent Semantic Analysis (LSA) models, etc. These additions/alternatives to natural language models have their specific use cases and limitations. Accordingly, in various embodiments, the systems and methods described herein may be configured to implement one or more various models to achieve different results based on the nature of the query, the context of the implementation, and/or other factors.

Figure 2:
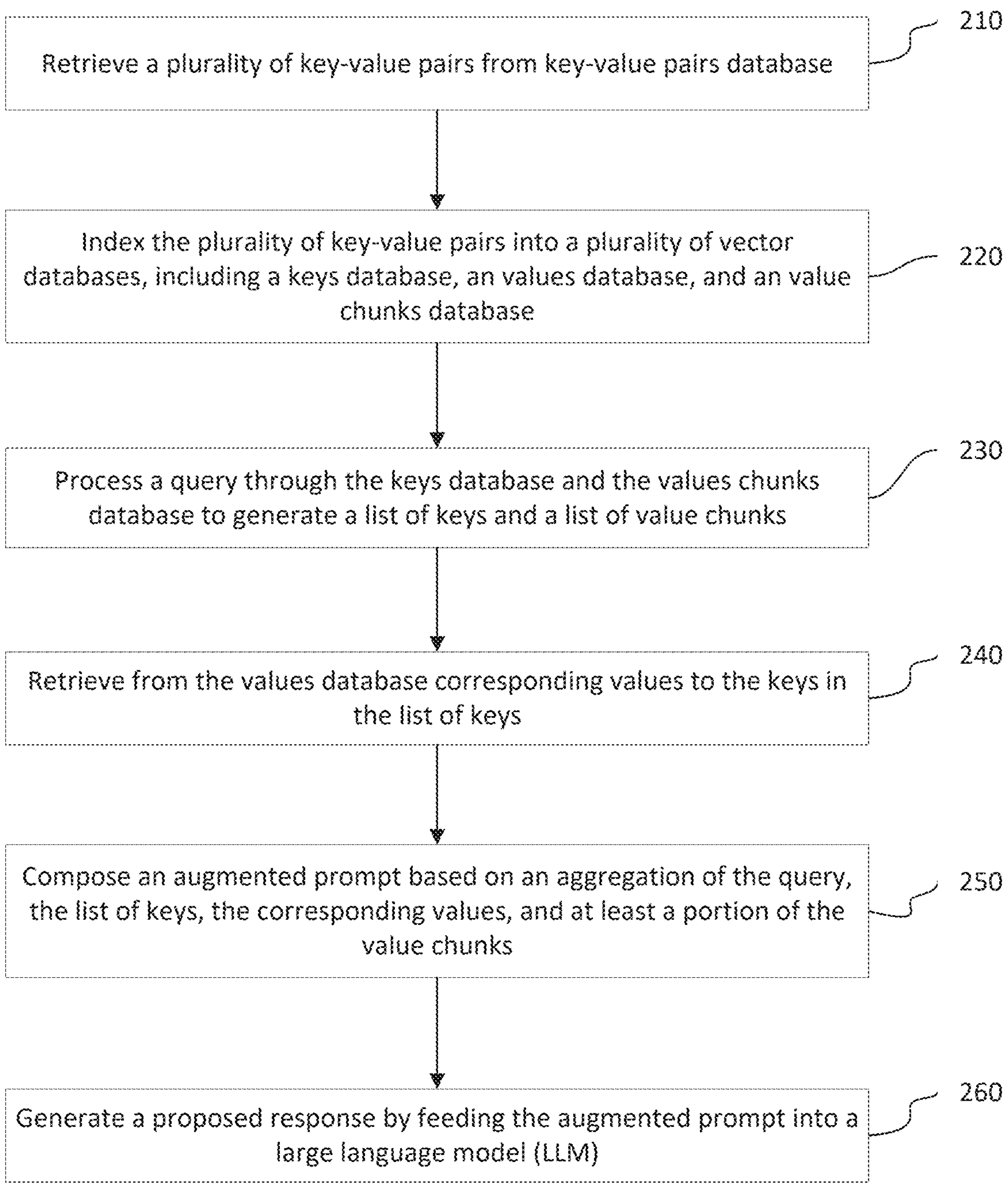
FIG. 2 depicts an example method for providing improved retrieval augmented generation for query response, in accordance with at least one embodiment.

These and other features of system 100 will be further understood with reference to method 200 of FIG. 2, herein.

FIG. 2 depicts an example method 200 for providing improved retrieval augmented generation for query response, in accordance with at least one embodiment. In various embodiments, method 200 may be implemented by system 100, executing code in one or more processors therein. For example, in some embodiments, method 200 may be performed on a computer (e.g., computer system 1000 of FIG. 5) having one or more processors (e.g., processor(s) 1010 of FIG. 5) and memory (e.g., system memory 1020 of FIG. 5), and one or more code sets, applications, programs, modules, and/or other software stored in the memory and executing in or executed by one or more of the processor(s).

Method 200 begins at step 210 when a processor (e.g., of server 110) is configured to retrieve a plurality of key-value pairs (e.g., question-and-answer pairs) from a key-value pairs (e.g., question-and-answer pairs) database. As noted herein, in some embodiments, the key-value pairs database may consist of structured datasets containing pairs of keys and their corresponding values, e.g., questions and their corresponding answers. These pairs may be derived from historical user interactions, curated content repositories, knowledge bases, or externally sourced datasets. The data may include plain text, multimedia metadata, or semantic embeddings of key-value pairs. This data may cover a broad range of domains or be specialized for particular applications.

In various embodiments the key-value pair database may be populated with key-value pairs through a variety of methods and sources, depending on the intended use case and the specific requirements of the RAG system. The population process may involve automated, manual, or hybrid approaches to gather, organize, and refine the key-value pairs. These approaches may include data ingestion from historical user interactions, curation of existing content repositories, integration with external systems, and/or real-time updates.

In some embodiments, historical user interactions may serve as a primary source for populating the database. For example, logs of RFPs, DDQs, customer service inquiries, and/or other requests for information, and their corresponding responses, may be extracted from various databases and/or communication platforms such as email, chat systems, or call center transcripts. These interactions may be processed to structure the data into key-value pairs such as question-and-answer pairs, e.g., using natural language processing (NLP) techniques to identify and segment the questions and corresponding answers from conversational text.

Some embodiments may involve the curation of content from existing repositories or knowledge bases. Such repositories may include product documentation, frequently asked questions (FAQ) pages, user manuals, or other structured information sources. These materials may be systematically reviewed, extracted, and formatted into key-value pairs, e.g., Q&A pairs, with metadata annotations added to facilitate indexing and retrieval. In cases where the content is unstructured, NLP tools may be employed to identify questions and corresponding answers automatically.

Externally sourced datasets may also be utilized in certain embodiments. External data may be particularly valuable in specialized applications where domain-specific knowledge may be beneficial. Before integration into the key-value database, such data may undergo validation and enrichment processes to ensure its accuracy, relevance, and consistency with the system's requirements.

In some embodiments, semantic embeddings of the key-value pairs may be generated and stored alongside the text data. These embeddings may be created using machine learning models trained to capture the semantic relationships between keys and values, e.g., between questions and answers. Semantic embeddings enable more efficient similarity searches and may enhance the performance of the retrieval process, especially in large-scale databases. Some embodiments may support the population of the key-value database through real-time updates. For instance, new key-value pairs may be dynamically added based on ongoing user interactions or as new content becomes available. In these cases, the system may implement pipelines that automatically ingest, preprocess, and store new data into the database. Real-time updates may also involve integrating with APIs or other data sources that continuously supply relevant key-value pairs. Additionally, in some embodiments, the key-value database may include metadata annotations for each pair, such as domain tags, timestamps, source information, confidence scores, and/or usage statistics. These annotations may provide contextual information that enhances the retrieval process by enabling filtering or prioritization of results based on specific criteria, such as relevance to a particular topic or recency.

Hybrid approaches may also be implemented, combining manual and automated methods to populate the key-value database. For example, domain experts may review and validate automatically extracted key-value pairs to help with quality-control. Machine learning models may also be iteratively trained and fine-tuned using labeled data from expert-reviewed key-value pairs. These various embodiments for populating the key-value pair database may enable the creation of a comprehensive, accurate, and contextually rich resource tailored to the needs of the RAG system and its specific application domain.

At step 220, in some embodiments, the processor may be configured to index the plurality of key-value (e.g., question-and-answer) pairs into a plurality of vector stores. For example, a first vector store may contain keys (e.g., questions) extracted from the plurality of key-value pairs, a second vector store may contain values (e.g., answers) extracted from the plurality of key-value pairs, and a third vector store may contain a plurality of value chunks (e.g., answer chunks) of the values (e.g., answers). Embodiments may facilitate efficient and targeted access to relevant data by structuring and organizing the indexed information in a way that supports high-precision query matching.

In some embodiments, the processor may create a first vector store containing keys extracted from the plurality of key-value pairs. Each key may be transformed into a vector representation using an embedding model that encodes the semantic meaning of the key. This vector store may be used to match incoming queries with stored keys based on similarity scores, enabling the system to identify keys, e.g., questions, that closely resemble or are otherwise related to the input query.

In some embodiments, a second vector store may store values, e.g., answers) extracted from the key-value pairs. Similar to the key store, the values may be converted into vector representations. This store allows the system to directly retrieve values based on their relevance to a given query, either as standalone results or in conjunction with the key store. For example, when a query matches multiple stored questions, the corresponding values may be retrieved from the second store to provide relevant responses.

In additional embodiments, the processor may segment values (e.g., answers) into smaller components, or "value chunks," and store these chunks in a third vector store. Each chunk may be processed to generate vector embeddings that capture its semantic content. The chunking process may involve dividing values into segments of a predefined size, such as 500 characters, with optional overlap between adjacent chunks. Overlapping segments may enhance retrieval accuracy by preserving continuity across chunks so that key contextual information is retained.

In various embodiments, the third vector store of answer chunks may serve multiple purposes. By storing smaller segments of values, the system may achieve finer granularity in the retrieval process, enabling it to focus on the most relevant parts of a value (e.g., an answer) rather than processing the entire response. For example, when a query matches a portion of an answer, the corresponding chunk may be retrieved and provided to the LLM to generate a more precise and contextually appropriate response. This approach may reduce noise by excluding irrelevant portions of the answer, which may otherwise dilute the quality of the generated output. Embodiments may further involve interactions between the three vector stores during the retrieval process, as described in detail herein.

In some embodiments, the processor may implement various indexing techniques to optimize the storage and retrieval of vectorized data across the three vector stores. For example, approximate nearest neighbor (ANN) search algorithms, such as FAISS or HNSW, may be used to accelerate similarity searches in high-dimensional vector spaces. Additional indexing strategies, such as clustering or hierarchical indexing, may further improve performance by organizing vectors based on their semantic relationships. In some embodiments, the system may periodically update the vector stores to reflect changes in the underlying key-value pairs. This updating process may involve re-embedding updated data, removing obsolete entries, and/or re-indexing the vector stores to maintain their accuracy and relevance. In some embodiments, these updates may occur dynamically or on a scheduled basis, depending on the requirements of the application.

At step 230, in some embodiments, the processor may be configured to process a query through the first vector store (the keys data store) and the third vector store (the value chunks data store) to generate a list of keys from the first vector store and a list of value chunks from the third vector store. In some embodiments, the processor may leverage vectorized semantic representations and/or similarity search techniques (e.g., cosine similarity) to identify the most pertinent data for further processing by the system. In some embodiments, the query may first be embedded into a vector representation using a pre-trained embedding model. This model captures the semantic meaning of the query, allowing it to be compared against the pre-indexed vectors stored in the vector stores. The processor may then utilize this embedded query to perform similarity searches within the first vector store and the third vector store.

In some embodiments, when processing the query through the first vector store, the processor may compare the query's vector(s) with the vectors of stored keys. This similarity comparison may employ a metric such as cosine similarity or Euclidean distance to calculate the degree of alignment between the query and each stored key. Based on these similarity scores, the processor may generate a ranked list of keys from the first vector store. The highest-ranking keys in this list may be those that most closely resemble the semantic content of the query. For example, if the query is "How to reset my device?" the list of keys may include entries such as "How do I reset my phone?" or "What are the steps to restart a device?

In some embodiments, the processor may process the query through the third vector store (e.g., concurrently, etc.), which contains the vectorized value chunks. Similar to the process with the keys data store, the processor may compute similarity scores between the query vector(s) and the vectors of stored value chunks. Based on these scores, a ranked list of value chunks may be generated. The chunks in this list are those deemed most relevant to the query. For example, if the query relates to resetting a device, the value chunks retrieved may include segments such as "Step 1: Hold the power button for 10 seconds" or "Ensure the device is charged before resetting."

In some embodiments, the processor may apply thresholds to filter the retrieved lists. For instance, only keys and value chunks with similarity scores above a predefined threshold may be included in their respective lists. This filtering may reduce noise such that only the most relevant data is considered in subsequent steps of the process. In some embodiments, additional or alternative refinements may be applied to the lists. For example, in some embodiments, the processor may prioritize keys and value chunks based on metadata, such as relevance to specific domains, recent usage frequency, or source reliability. This prioritization may allow the system to tailor the output to the query's context or the application's requirements. In embodiments where the query is ambiguous or broad, the processor may retrieve a diverse set of keys and value chunks to provide comprehensive coverage of potential interpretations. Conversely, for highly specific queries, the processor may narrow the lists to include only the most precise matches.

In various embodiments, the list of value chunks generated from the query's processing through the third vector store may be used to refine the list of keys retrieved from the first vector store. This refinement process may enhance the relevance of the keys by leveraging the semantic alignment between the retrieved value chunks and the original query. For example, in some embodiments, initially, when the query is processed through the value chunks data store, the retrieved list of value chunks may represent the most contextually relevant portions of stored values. These chunks may contain concise and specific information directly related to the query's intent. In some embodiments, the system may analyze the semantic content of these value chunks to derive patterns or key themes that align closely with the query. For example, if the value chunks contain information about resetting a device, the themes might involve specific steps or troubleshooting methods related to that topic.

Once this list of value chunks is available, the system may utilize it to further filter or reorder the list of keys. In one embodiment, the processor may re-embed the value chunks into vector representations and compute similarity scores between these chunk vectors and the vectors of keys in the list retrieved from the first vector store. Keys that exhibit higher similarity to the most relevant value chunks may be ranked higher or selected for inclusion in the refined list of keys. For example, if the top value chunks discuss "steps to reset a phone," questions explicitly related to device resetting may be prioritized.

In some embodiments, the system may identify semantic overlap or shared keywords between the value chunks and the retrieved keys. This process may involve comparing the text of the value chunks with the text of the keys. If specific terms, phrases, or contextual markers appear frequently in both, the corresponding keys may be flagged as more relevant. For instance, if an value chunk discusses "holding the power button for 10 seconds," keys mentioning "power button" or "resetting steps" may be prioritized. Of course, in other embodiments, this comparison may be implemented as an initial step in the list generating process, rather than as a refinement of generated lists.

In some embodiments, the refinement process may also or alternatively involve removing keys that are less relevant to the themes identified in the value chunks. For example, if certain retrieved keys are semantically distant from the main topics discussed in the value chunks, they may be excluded from the final list of keys. This exclusion reduces noise so that the refined list is more focused on the query's intent.

In another embodiment, the system may dynamically adjust the refinement process based on the confidence or quality scores of the retrieved value chunks. For example, if a particular set of value chunks has high similarity scores with the query, the corresponding semantic themes may be weighted more heavily during the refinement of the key list. Conversely, if the similarity scores of the value chunks are lower, the system may rely more on the original ranking of the keys data store. The refined list of keys, now tailored to align with the retrieved value chunks, may be used as an input for downstream processes, such as presenting the most relevant keys to the user, retrieving additional data from associated value stores, serving as context for a generative AI model, and/or retrieving corresponding values to the most relevant keys, as described herein. By iteratively refining the keys using the semantic context derived from value chunks, the system may achieve a higher degree of precision and relevance in addressing the user query.

The outputs of step 230, consisting of the list of keys from the first vector store and the list of value chunks from the third vector store, may serve as inputs for subsequent processing stages. For example, these lists may be used to refine the retrieval process, provide context to a Large Language Model (LLM), or generate final responses tailored to the user's query.

At step 240, in some embodiments, the processor may be configured to retrieve from the second vector store (the values data store), corresponding values to the keys in the list of keys from the first vector store (the keys data store). In some embodiments, this multi-stage retrieval process may leverage the contextual alignment between the query, the value chunks, and the corresponding keys to accurately identify and extract the most relevant full values.

As explained above, in some embodiments, the processor may be configured to cross-reference the list of keys retrieved from the first vector store with the list of value chunks derived from the third vector store. The list of value chunks may serve as a refinement tool, providing semantic insights that may prioritize or filter the keys based on their alignment with the query. This refined list of keys, which reflects the most contextually relevant matches to the user query, may then be used as input for retrieving the full values. In some embodiments, the processor may use the list of keys to retrieve the corresponding values from the values data store that were originally pairs with them in the key-value pairs. In some embodiments, the processor may process each key in the refined list by embedding it into a vector representation, which is then compared against the pre-indexed vectors in the second vector store, e.g., as an added confirmation of relevance. Using similarity scoring techniques, such as cosine similarity or Euclidean distance, the processor may identify the full values most closely associated with each key in the refined list. For example, if a key such as "How do I reset my device?" is included in the refined list, the processor retrieves the corresponding answer, such as "To reset your device, press and hold the power button for 10 seconds until it restarts."

In some embodiments, the list of value chunks may play a direct role in influencing the retrieval process from the second vector store. For instance, the semantic content of the top-ranked value chunks may be compared to the candidate values retrieved from the vector store. If the semantic alignment between a value chunk and a candidate full value is high, the corresponding full value may be prioritized for inclusion in the final results. This may help confirm that the retrieved values are not only tied to the refined keys but also align with the specific aspects of the query captured by the value chunks.

To further enhance the retrieval process, in some embodiments, the processor may implement a ranking or scoring mechanism that considers multiple factors, such as the relevance of the key to the query, the similarity between the value chunk and the candidate values, and any associated metadata (e.g., domain tags, confidence scores, or recency). For example, an value associated with a key that has a high similarity to both the query and the top value chunks may receive a higher priority in the retrieval process.

Once the complete values are retrieved, they may be aggregated into a list and/or prioritized based on their relevance. In some embodiments, the processor may return these values directly to the user or provide them as input to a downstream component, as described herein. In scenarios where the list of keys includes multiple matches for the query, e.g., where the direct corresponding values from the key-value pairs is not utilized in retrieving the complete values, or where multiple complete values are identified based on their corresponding keys in the key-value pairs, the values retrieved from the second vector store may be filtered or grouped, e.g., based on their semantic content. For instance, if two keys in the list share similar topics, their corresponding values may be combined, refined, or presented together to avoid redundancy and improve the clarity of the final output.

At step 250, in some embodiments, the processor may be configured to compose an augmented prompt based on an aggregation of the query, the list of keys, the corresponding values, and at least a portion of the value chunks from the list of value chunks. In some embodiments, the augmented prompt may integrate multiple layers of contextual data to enhance the LLM's ability to generate an accurate and contextually relevant response to the original query. In some embodiments, the processor may include the original query as the primary context for the prompt, preserving its phrasing or slightly reformatting it for better alignment with the additional data. The list of keys retrieved may serve to expand the contextual scope of the query, particularly in cases where the query is ambiguous or could benefit from further clarification. For example, the augmented prompt may explicitly present the most relevant keys as supporting context, e.g., preceded by indicators such as "Relevant questions include:" to guide the LLM in understanding the user's intent.

In some embodiments, the corresponding values retrieved from the second vector store are included in the augmented prompt to provide substantive information that directly addresses the query. In some embodiments, these values may be filtered or prioritized based on their relevance and may be presented as authoritative content to inform the LLM's response generation process. In some embodiments, the processor may also include a selection of value chunks retrieved from the third vector store, e.g., the list of chunks or some subgroup thereof. These chunks may serve as supplementary evidence, providing precise and targeted excerpts that align with the query. For example, in some embodiments, value chunks containing key steps or critical information may be prefaced with statements such as "Supporting details include:" so that their relevance is highlighted within the augmented prompt.

At step 260, in some embodiments, the processor may be configured to generate a proposed response by feeding the augmented prompt into the LLM. In some embodiments, the LLM may utilize the structured and enriched context provided by the augmented prompt to produce a response that has a higher degree of accuracy and is contextually aligned with the original query. By combining the broad contextual scope of the query and keys with the targeted information from the values and value chunks, the LLM is able to generate a response that addresses the query with higher precision and depth. In some embodiments, the proposed response generated by the LLM may then be returned as the system's output or further refined through additional processing, such as re-ranking or human validation, depending on the implementation. These embodiments may optimize the interaction between the query, the aggregated data, and the LLM, enabling a comprehensive and context-sensitive response.

Figure 3:
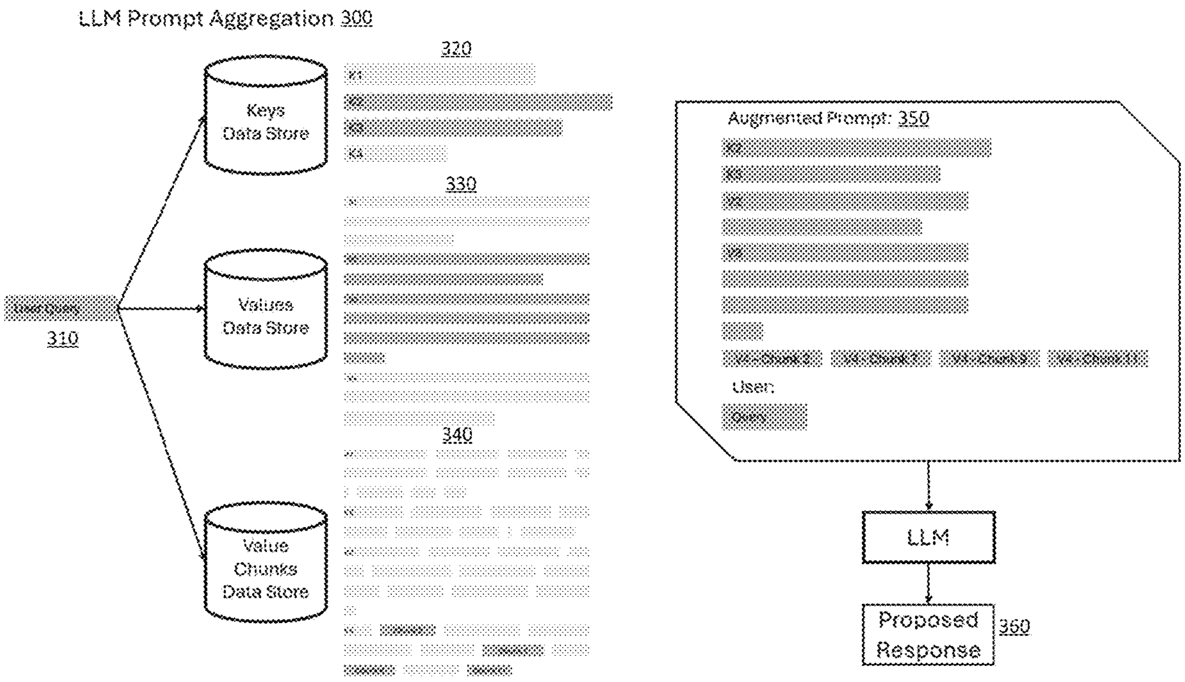
FIG. 3 depicts a schematic of an example LLM prompt aggregation, according to at least one embodiment.

Turning briefly to FIG. 3, a schematic of an LLM prompt aggregation 300 is shown according to at least one embodiment of the invention. As explained herein with respect to method 200, in various embodiments, a user query 310 may be processed through multiple vector stores. The processing may result in generation of a key list 320 extracted from a keys data store, an values list 330 extracted from an values data store, and an value chunks list 340 extracted from an value chunks data store. These lists may then be aggregated, along with the original query, into an augmented prompt 350. In some embodiments, the augmented prompt 350 may then be fed into an LLM to produce a proposed response 360.

Figure 4:
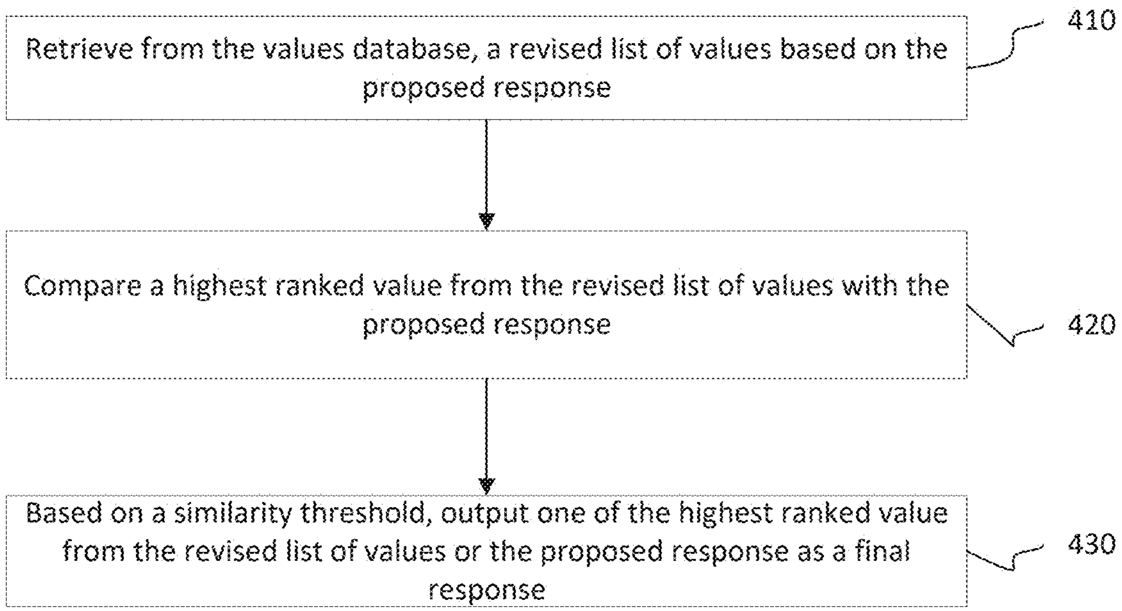
FIG. 4 depicts an example method for providing additional improved retrieval augmented generation for query response, in accordance with at least one embodiment.

Turning to FIG. 4, FIG. 4 depicts an example method 400 for providing additional improved retrieval augmented generation for query response, in accordance with at least one embodiment. In various embodiments, method 400 may be an extension of method 200 (FIG. 2), and may likewise be implemented by system 100, executing code in one or more processors therein. For example, in some embodiments, method 400 may be performed on a computer (e.g., computer system 1000 of FIG. 5) having one or more processors (e.g., processor(s) 1010 of FIG. 5) and memory (e.g., system memory 1020 of FIG. 5), and one or more code sets, applications, programs, modules, and/or other software stored in the memory and executing in or executed by one or more of the processor(s).

Method 400 begins at step 410 when a processor is configured to retrieve from the second store (the value store), a revised list of values based on the proposed response. In some embodiments, the processor is configured to retrieve a revised list of values from the second vector store, which contains full values corresponding to the original key-value pairs. This revised list may be generated by comparing the proposed response (generated in method 200 of FIG. 2, as explained in detail herein) with the entries in the value store. In some embodiments, the similarity between the proposed response and the store entries may be calculated using a vectorized comparison metric, such as cosine similarity. This similarity computation may allow the processor to identify and rank the values in the store that align most closely with the semantic content of the proposed response. In some embodiments, the revised list of values may also be dynamically adjusted and reranked based on predefined criteria, such as user-defined priorities or additional metadata, to further refine the ranking. For instance, a user may prioritize values tagged with high confidence levels or recent timestamps, or the system may incorporate domain-specific relevance scoring during the re-ranking process.

At step 420, in some embodiments, the processor may be configured to compare a highest ranked value from the revised list of values with the proposed response (generated by the LLM). This comparison may serve to evaluate the alignment and relevance of the curated value relative to the generative output of the LLM (the proposed response), such that the final response meets a predefined standard of accuracy and contextual appropriateness. In some embodiments, the comparison process may involve calculating a similarity score between the highest-ranked value and the proposed response using advanced similarity metrics.

In some embodiments, the similarity computation may employ metrics specifically designed for high-dimensional vector spaces, such as cosine similarity, Euclidean distance, or dot product similarity. These metrics analyze the degree of alignment between the vector embeddings of the highest-ranked value and the proposed response, where the embeddings are generated using pre-trained or fine-tuned language models capable of capturing semantic relationships. A high similarity score indicates that the highest-ranked value closely matches the intent, context, or content of the proposed response, while a low score suggests divergence or insufficient relevance.

In some embodiments, the system may incorporate a user-defined similarity threshold, which determines whether the highest-ranked value is sufficiently aligned with the proposed response to be selected as the final response. This threshold may range, for example, between 80% and 90%, although the exact value may be adjustable based on application-specific requirements. For instance, in a domain requiring high precision, the threshold may be set closer to 90%, demanding a greater level of alignment for the highest-ranked value to be chosen. Conversely, in more general-purpose applications, a lower threshold may be acceptable.

In certain embodiments, the processor may further analyze the similarity score in the context of additional factors, such as metadata associated with the highest-ranked value or the confidence score of the proposed response. For example, if the metadata indicates that the highest-ranked value is particularly authoritative or recently updated, the system may assign it greater weight in the comparison process. Similarly, if the LLM's confidence score for the proposed response is high, the system may consider a slightly lower similarity threshold to favor the generative output.

In some embodiments, the comparison process may also involve assessing the semantic granularity of the similarity score. For example, if the highest-ranked value provides a detailed explanation that aligns with the core intent of the proposed response but introduces additional context or examples, the similarity score may still exceed the threshold due to the shared underlying semantic structure. Conversely, if the highest-ranked value is overly broad or fails to address key aspects of the proposed response, the similarity score may fall below the threshold, prompting the system to rely on the proposed response instead.

In some embodiments, the system may implement additional layers of processing to enhance the accuracy of the comparison. For example, the processor may segment the highest-ranked value and the proposed response into smaller units, such as sentences or phrases, and perform a fine-grained similarity analysis at this level. This granular approach may reveal alignment in specific segments of the content, which may then inform the overall similarity score.

By dynamically comparing the highest-ranked value with the proposed response using robust similarity metrics and configurable thresholds, the system may achieve a balance between the reliability of curated values and the flexibility of LLM-generated content. This step enables the system to make an informed selection for the final response, such that the output is both accurate and contextually aligned with the original query.

At step 430, in some embodiments, the processor may be configured to output, based on a similarity threshold, one of the highest ranked values from the revised list of values or the proposed response as a final response. In some embodiments, if the similarity score of the highest-ranked value exceeds the defined threshold, the system may select this value as the final response and outputs it to the user. This approach leverages the reliability and precision of the curated values in the store, which may provide more authoritative or specific information compared to the LLM-generated response. Conversely, if the similarity score is below the threshold, indicating that the highest-ranked value is not sufficiently aligned with the query or the context provided in the proposed response, the system outputs the LLM-generated proposed response as the final response. This enables the system to rely on the broader context and flexibility of the LLM to generate an appropriate value when the store does not contain a sufficiently relevant entry.

In some embodiments, additional logic may be applied to handle cases where multiple values in the revised list have high similarity scores, allowing the system to combine or synthesize these values with the proposed response to generate a more comprehensive final response. Similarly, the similarity threshold may be dynamically adjusted based on factors such as query complexity, user preferences, or confidence scores associated with the retrieved values. These embodiments provide a flexible and robust framework for selecting the most relevant and accurate response, balancing the strengths of the curated value store and the generative capabilities of the LLM.

In some embodiments, both the top ranking value and the proposed response may be provided to the user for selection as the final response. In some embodiments, the system may combine the top full value retrieved from the revised list of values and the LLM-generated proposed response to generate a final response that improves on either individual input. This combination process may leverage the strengths of both the curated value from the database and the generative capabilities of the LLM to produce a response that is more comprehensive, accurate, and contextually nuanced.

The combination process may begin by aligning the content of the top full value and the proposed response. The processor may analyze the semantic content of both inputs to identify overlapping, complementary, or divergent information. For example, if the top full value provides detailed, fact-based information and the proposed response adds contextual or explanatory details, the system may merge these elements to enhance the depth and clarity of the final response.

In some embodiments, the system may structure the combination by prioritizing key information from the top full value and supplementing it with additional insights from the proposed response. This structured approach may involve segmenting both inputs into smaller units, such as sentences or phrases, and selecting the most relevant or unique elements from each. For instance, the top full value might provide step-by-step instructions, while the LLM-generated response adds a brief introduction or context to frame these steps in a way that aligns with the query. In some embodiments, the system may also implement ranking or weighting mechanisms to guide the combination process. In some embodiments, metadata associated with the top full value, such as source reliability, timestamp, or domain specificity, may influence the extent to which its content is prioritized in the final response. Similarly, the confidence score or fluency of the LLM-generated response may determine how much weight is given to its content.

To achieve seamless integration, the system may employ natural language generation (NLG) techniques to harmonize the style and tone of the combined response. For example, the processor may rephrase or restructure sentences so that the final response reads coherently and maintains a consistent voice. This step is particularly useful in cases where the top full value and the proposed response differ significantly in style or formatting.

In some embodiments, the combination process may include a conflict resolution mechanism to address discrepancies between the top full value and the proposed response. If the two inputs provide conflicting information, the system may analyze supporting evidence, metadata, or additional context to resolve the inconsistency. For instance, if the top full value is derived from a verified knowledge base, it may take precedence over the generative content from the LLM. Conversely, if the LLM-generated response introduces new and relevant context that aligns with the query, it may be given priority.

The final response may also incorporate annotations or explanations that highlight the origins of specific elements, particularly in applications where transparency is important. For example, the system might indicate that factual information is sourced from the curated database, while supplementary context is generated by the LLM. By combining the top full value and the LLM-generated proposed response, in some embodiments, the system may produce a final response that integrates the factual reliability of the curated database with the contextual adaptability of generative AI. This approach may not only enhance the quality and relevance of the response but also allow the system to address complex queries that require a blend of structured data and nuanced interpretation.

Figure 5:
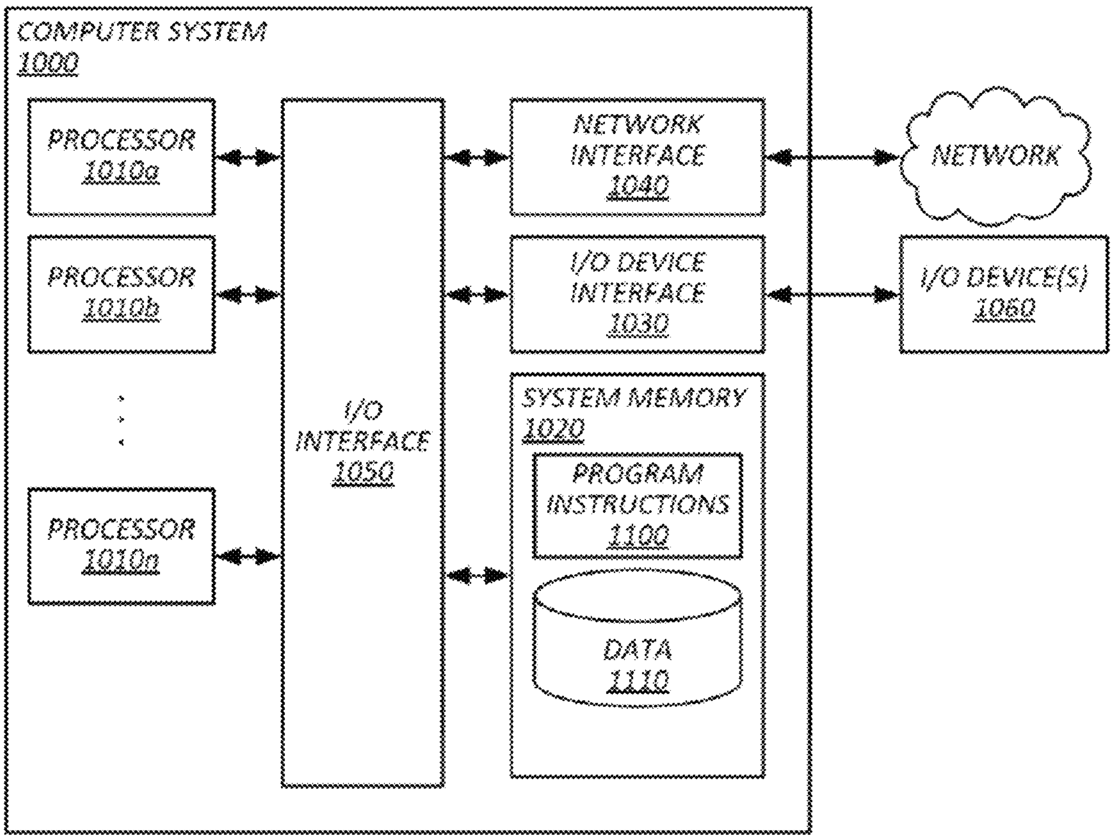
FIG. 5 depicts an example computer system on which systems and methods described herein may be executed, in accordance with at least one embodiment.

Some embodiments may execute the above operations on a computer system, such as the computer system of FIG. 5, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in key, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

While the systems and methods described herein have generally be described with respect to a single legacy language being translated to a modernized coding language (e.g., one-to-one translation of a first language to a second language), in various embodiments, the same processes may be implemented in a one-to-many framework. For example, in some embodiments, a user may indicate one or more second languages to which a first language is to be translated. Additionally or alternatively, in some embodiments, one or more translation recommendations may be provided (as described herein) for multiple translations. In either event, embodiments of the systems and methods described herein may be configured to process multiple translations, e.g., in parallel and/or in series (e.g., based on an identified priority), as described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing improved retrieval augmented generation (RAG) for query response, comprising:

retrieving, by a processor, a plurality of key-value pairs from a key-value pairs database;

indexing, by the processor, the plurality of key-value pairs into a plurality of vector stores, wherein a first vector store contains the keys from the plurality of key-value pairs, a second vector store contains the values from the plurality of key-value pairs, and a third vector store contains a plurality of value chunks of the values;

processing, by the processor, a query through the first vector store and the third vector store to generate a list of keys from the first vector store and a list of value chunks from the third vector store;

retrieving, from the second vector store, corresponding values to the keys in the list of keys from the first vector store;

composing, by the processor, an augmented prompt based on an aggregation of the query, the list of keys, the corresponding values, and at least a portion of the value chunks from the list of value chunks;

generating, by the processor, a proposed response by feeding the augmented prompt into a large language model (LLM);

retrieving, by the processor, from the second vector store, a revised list of values based on the proposed response;

comparing, by the processor, a highest ranked value from the revised list of values with the proposed response; and based on a similarity threshold, outputting, by the processor, one of the highest ranked value from the revised list of values or the proposed response as a final response.

2. The method as in claim 1, further comprising altering the revised list of values based on one or more additional criteria for reranking values in the revised list of values.

3. The method as in claim 1, wherein the key-value pairs are stored in an external data store.

4. The method as in claim 1, wherein the processor is configured to retrieve as least one of keys, values, or value chunks based on respective cosine similarity scores.

5. The method as in claim 1, wherein the value chunks are generated by breaking down the values from the plurality of key-value pairs into shorter chunks of data.

6. The method as in claim 1, wherein the plurality of key-value pairs comprises a plurality of question-and-answer pairs; and wherein the key-value pairs are stored in a question-and-answer pairs store.

7. A method for providing improved retrieval augmented generation (RAG) for query response, comprising:

retrieving, by a processor, a plurality of question-and-answer pairs from a question-and-answer pairs database;

indexing, by the processor, the plurality of question-and-answer pairs into a plurality of vector databases, wherein a first vector database contains the questions from the plurality of question-and-answer pairs, a second vector database contains the answers from the plurality of question-and-answer pairs, and a third vector database contains a plurality of answer chunks of the answers;

processing, by the processor, a query through the first vector database and the third vector database to generate a list of questions from the first vector database and a list of answer chunks from the third vector database;

retrieving, from the second vector database, corresponding answers to the questions in the list of questions from the first vector database;

composing, by the processor, an augmented prompt based on an aggregation of the query, the list of questions, the corresponding answers, and at least a portion of the answer chunks from the list of answer chunks;

generating, by the processor, a proposed response by feeding the augmented prompt into a large language model (LLM);

retrieving, by the processor, from the second database, a revised list of answers based on the proposed response;

comparing, by the processor, a highest ranked answer from the revised list of answers with the proposed response; and based on a similarity threshold, outputting, by the processor, one of the highest ranked answer from the revised list of answers or the proposed response as a final response.

8. The method as in claim 7, further comprising altering the revised list of answers based on one or more additional criteria for reranking answers in the revised list of answers.

9. The method as in claim 7, wherein the question-and-answer pairs database is an external database.

10. The method as in claim 7, wherein the processor is configured to retrieve as least one of questions, answers, or answer chunks based on respective cosine similarity scores.

11. The method as in claim 7, wherein the answer chunks are generated by breaking down the answers from the plurality of question-and-answer pairs into shorter chunks of text.

12. A system for providing improved retrieval augmented generation (RAG) for query response, comprising:

memory storing computer program instructions; and one or more processors configured to execute the computer program instructions to:

retrieve a plurality of key-value pairs from a key-value pairs database;

index the plurality of key-value pairs into a plurality of vector stores, wherein a first vector store contains the keys from the plurality of key-value pairs, a second vector store contains the values from the plurality of key-value pairs, and a third vector store contains a plurality of value chunks of the values;

process a query through the first vector store and the third vector store to generate a list of keys from the first vector store and a list of value chunks from the third vector store;

retrieve, from the second vector store, corresponding values to the keys in the list of keys from the first vector store;

compose, an augmented prompt based on an aggregation of the query, the list of keys, the corresponding values, and at least a portion of the value chunks from the list of value chunks;

generate a proposed response by feeding the augmented prompt into a large language model (LLM);

retrieve, from the second vector store, a revised list of values based on the proposed response;

compare a highest ranked value from the revised list of values with the proposed response; and based on a similarity threshold, output one of the highest ranked value from the revised list of values or the proposed response as a final response.

13. The system as in claim 12, further configured to alter the revised list of values based on one or more additional criteria for reranking values in the revised list of values.

14. The system as in claim 12, wherein the key-value pairs are stored in an external data store.

15. The system as in claim 12, wherein the processor is configured to retrieve as least one of keys, values, or value chunks based on respective cosine similarity scores.

16. The system as in claim 12, wherein the value chunks are generated by breaking down the values from the plurality of key-value pairs into shorter chunks of data.

17. The system as in claim 12, wherein the plurality of key-value pairs comprises a plurality of question-and-answer pairs; and wherein the key-value pairs are stored in a question-and-answer pairs store.

* * * * *